United States Patent
Hayaishi

(10) Patent No.: US 7,945,113 B2
(45) Date of Patent: May 17, 2011

(54) ENHANCEMENT OF IMAGE DATA BASED ON PLURAL IMAGE PARAMETERS

(75) Inventor: Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 968 days.

(21) Appl. No.: 11/709,634

(22) Filed: Feb. 21, 2007

(65) Prior Publication Data

US 2007/0211959 A1    Sep. 13, 2007

(30) Foreign Application Priority Data

Feb. 22, 2006 (JP) ................. 2006-045039

(51) Int. Cl.
*G06K 9/40* (2006.01)
*G06K 9/00* (2006.01)

(52) U.S. Cl. ................... 382/274; 382/167
(58) Field of Classification Search .......... 382/274
See application file for complete search history.

(56) References Cited

U.S. PATENT DOCUMENTS

| | | | |
|---|---|---|---|
| 5,420,630 A * | 5/1995 | Takei | 348/223.1 |
| 5,715,377 A | 2/1998 | Fukushima et al. | |
| 5,940,530 A | 8/1999 | Fukushima et al. | |
| 6,661,918 B1 * | 12/2003 | Gordon et al. | 382/173 |
| 6,996,270 B1 | 2/2006 | Ito | |
| 7,113,307 B1 | 9/2006 | Ohkubo | |
| 7,167,597 B2 | 1/2007 | Matsushima | |
| 7,315,657 B2 | 1/2008 | Matsushima | |
| 7,317,815 B2 * | 1/2008 | Steinberg et al. | 382/118 |
| 7,340,104 B2 * | 3/2008 | Fukuda | 382/254 |
| 7,454,056 B2 | 11/2008 | Hayaishi | |
| 7,783,126 B2 * | 8/2010 | Yamashita et al. | 382/274 |
| 2004/0156544 A1 * | 8/2004 | Kajihara | 382/167 |

FOREIGN PATENT DOCUMENTS

JP    08-062741    3/1996
(Continued)

OTHER PUBLICATIONS

Abstract of Japanese Patent Publication No. JP 2000-182043, Pub. Date: Jun. 30, 2000, Patent Abstracts of Japan.
(Continued)

*Primary Examiner* — Jingge Wu
*Assistant Examiner* — Patrick L Edwards
(74) *Attorney, Agent, or Firm* — Martine Penilla & Gencarella, LLP

(57) ABSTRACT

A technology is provided whereby correction may be carried out appropriately for both a person's face and other portions of an image, when performing color correction for image data of a photographic image in which a person appears. A process such as the following is carried out during color correction of image data of a photographic image. First, the image data of the photographic image is analyzed, and a first region which is part of the photographic image and in which a person's face is present is determined. Then, on the basis of the portion corresponding to the first region of the image data, a first parameter relating to color is calculated. On the basis of part of the image data corresponding to a second region which is part of the photographic image but different from the first region, a second parameter relating to color is calculated. The color tone of the data is then corrected on the basis of the first and second parameters.

7 Claims, 8 Drawing Sheets

FOREIGN PATENT DOCUMENTS

| | | |
|---|---|---|
| JP | 10-079854 | 3/1998 |
| JP | 2000-182043 | 6/2000 |
| JP | 2000-242775 | 9/2000 |
| JP | 2001-111858 | 4/2001 |
| JP | 2003-169231 | 6/2003 |
| JP | 2005-318523 | 11/2005 |

OTHER PUBLICATIONS

Abstract of Japanese Patent Publication No. JP 08-062741, Pub. Date: Mar. 8, 1996, Patent Abstracts of Japan.

Abstract of Japanese Patent Publication No. JP 10-079854, Pub. Date: Mar. 24, 1998, Patent Abstracts of Japan.

Abstract of Japanese Patent Publication No. JP 2000-242775, Pub. Date: Sep. 8, 2000, Patent Abstracts of Japan.

Abstract of Japanese Patent Publication No. JP 2001-111858, Pub. Date: Apr. 20, 2001, Patent Abstracts of Japan.

Abstract of Japanese Patent Publication No. JP 2003-169231, Pub. Date: Jun. 13, 2003, Patent Abstracts of Japan.

Abstract of Japanese Patent Publication No. JP 2005-318523, Pub. Date: Nov. 10, 2005, Patent Abstracts of Japan.

* cited by examiner

ENHANCEMENT OF IMAGE DATA BASED ON PLURAL IMAGE PARAMETERS

BACKGROUND

1. Technical Field

This invention relates to a technology for enhancing color of image data.

2. Related Art

Technology for enhancing color of image data images on the basis of the image data have been known for some time. For example, a region is determined in a photograph where a person's face appears, and color enhancement of the image data is performed so that the color of the person's face has a predetermined target chromaticity value.

However, since only the color of the person's face is taken into consideration when determining the content of color enhancement of image data, in some instances, color subsequent enhancement may appear unnatural in regions except for the person's face.

With the foregoing in view, an aspect of the invention is to provide technology whereby when enhancement is being performed for image data of a photographic image in which a human object appears, enhancement may be carried out appropriately for both the person's face and other portions of the image.

The entire disclosure of Japanese patent application No. 2006-45039, of SEIKO EPSON is hereby incorporated by reference into this document.

SUMMARY

In order to address above problems, an image processing device for enhancing image data, as one aspect of the invention, has the following portions. The image processing device includes: a first region determining portion configured to analyze image data, and determine a first region which is part of an image of the image data; a first parameter calculating portion configured to calculate a first parameter based on a portion of the image data which corresponds to the first region; a second parameter calculating portion configured to calculate a second parameter based on a portion of the image data corresponding to a second region which is part of the image and which differs from the first region; and an enhancing portion configured to enhance color tone of the image data based on the first and second parameters.

In enhancing color of image data, as another aspect of the invention, the following process may be performed. Image data is analyzed. Then a first region which is part of an image of the image data is determined. A first parameter is calculated based on a portion of the image data which corresponds to the first region. A second parameter is calculated based on a portion of the image data corresponding to a second region which is part of the image and which differs from the first region. Color tone of the image data is enhanced based on the first and second parameters.

According to the aspect described above, parameters can be generated respectively while distinguishing between a first region and a second region different from the first region, and the image can be enhanced so as to reflect these individual parameters. Thus, when enhancement is performed for an image, enhancement can be carried out appropriately for a plurality of objects.

The first region may be a region in which a human face is present. In such an aspect, the image data may be an image data of one or more photographic images. The first and second parameters may be parameters relating to color. The enhancement of the image may be performed by correcting color tone of the image data.

According to the aspect described above, parameters can be generated respectively while distinguishing between a first region in which a human face is present and a second region different from the first region, and the color tone of the image data can be enhanced so as to reflect these individual parameters. Thus, when enhancement is performed for an image in which a human object appears, enhancement can be carried out appropriately for both the person's face and other portions of the image.

In the enhancing the image data, performing the following process is preferable. A first target value representing a target value for the first parameter is prepared. A second target value representing a target value for the second parameter is prepared. Then the image data is enhanced based on weighted average of (a) a difference of the first target value and the first parameter and (b) a difference of the second target value and the second parameter.

An advantage of this aspect is that, for example, respective target values for the first and second regions can be established in advance to have values corresponding to preferred color tone for the respective regions. By establishing target values for the first and second regions in this way, enhancement can be performed in such a way as to adjust respective color tone of the first and second regions to a predetermined preferred color tone.

In the enhancing the image data, it is preferable to calculate a weight for the weighted average based on a difference of the first parameter and the second parameter. An advantage of this aspect is that, for example, both in instances where the first and second regions have similar color tone and in instances where they differ appreciably, enhancement appropriate to the image can be carried out.

A weight for the weighted average may be calculated based on a proportion of the first region in the image. An advantage of this aspect is as follows. When face portions make up a large proportion of an image, such as when an image is a close-up of the face or when faces appear at numerous locations, enhancement can be performed, for example, so as to impart preferred color tone to the color of the face. When face portions make up a small proportion of an image, enhancement can be performed, for example, so as to impart preferred color tone to the color of the background.

The first parameter may be average brightness of the first region. The second parameter may be average brightness of the second region. An advantage of this aspect is that enhancement can be carried out so as to approximate color tone of preferred lightness both for a human face and for other portions of an image.

In calculating the second parameter, it is preferable to determine, as the second region, a region taken from a region except for the first region of the image and whose colors of neighboring pixels resemble each other by at least a prescribed degree. An advantage of this aspect is higher probability that enhancement will be carried out in such a way as to produce preferred color tone of an object which exists in the background, for example.

A process such as the following may be performed during enhancement of image data. One mode is selected from among a plurality of processing modes. A third parameter is calculated based on the image data, when a processing mode of a first type is selected from among the plurality of processing modes. The image data is enhanced based on the third parameter, when the processing mode of the first type is selected from among the plurality of processing modes. The image data is enhanced based on the first and second parameters, when a processing mode of a second type other than the first type is selected from among the plurality of processing modes.

The plurality of processing modes may includes: (1) a first processing mode of the first type for processing an image whose principal object is a human object; (2) a second processing mode of the first type for processing an image whose principal object is a landscape; and (3) a third processing mode of the second type for processing an image whose principal objects are both a human object and a landscape.

An advantage of this aspect is that for an image having either a person or a landscape as the principal object, enhancement can be carried out appropriately for that principal object.

The third parameter may be a parameter relating to color.

In preferred practice, the third parameter may be determined based on a portion of the image data corresponding to a third region in the image, different from the first and second regions. For example, it would be preferable to determine the third parameter based on the entire region of the image.

In enhancing color of image data, as another aspect of the invention, the following process may be performed. Image data is analyzed to determine first and second regions which are parts of an image of the image data. Then the image data is enhanced based on both of a proportion of the first region in the image and a proportion of the second region in the image.

Various other possible aspects of the invention could include, for example, an image processing method and image processing device; a printing method and printing device; a computer program for achieving the functions of such a method or device; a recording medium having such a computer program recorded thereon; or a data signal containing such a computer program and embodied in a carrier wave.

These and other objects, features, aspects, and advantages of the present invention will become more apparent from the following detailed description of the preferred embodiments with the accompanying drawings.

DESCRIPTION OF EXEMPLARY EMBODIMENT

A. Embodiment 1

A1. Overall Device Configuration

Figure 1:
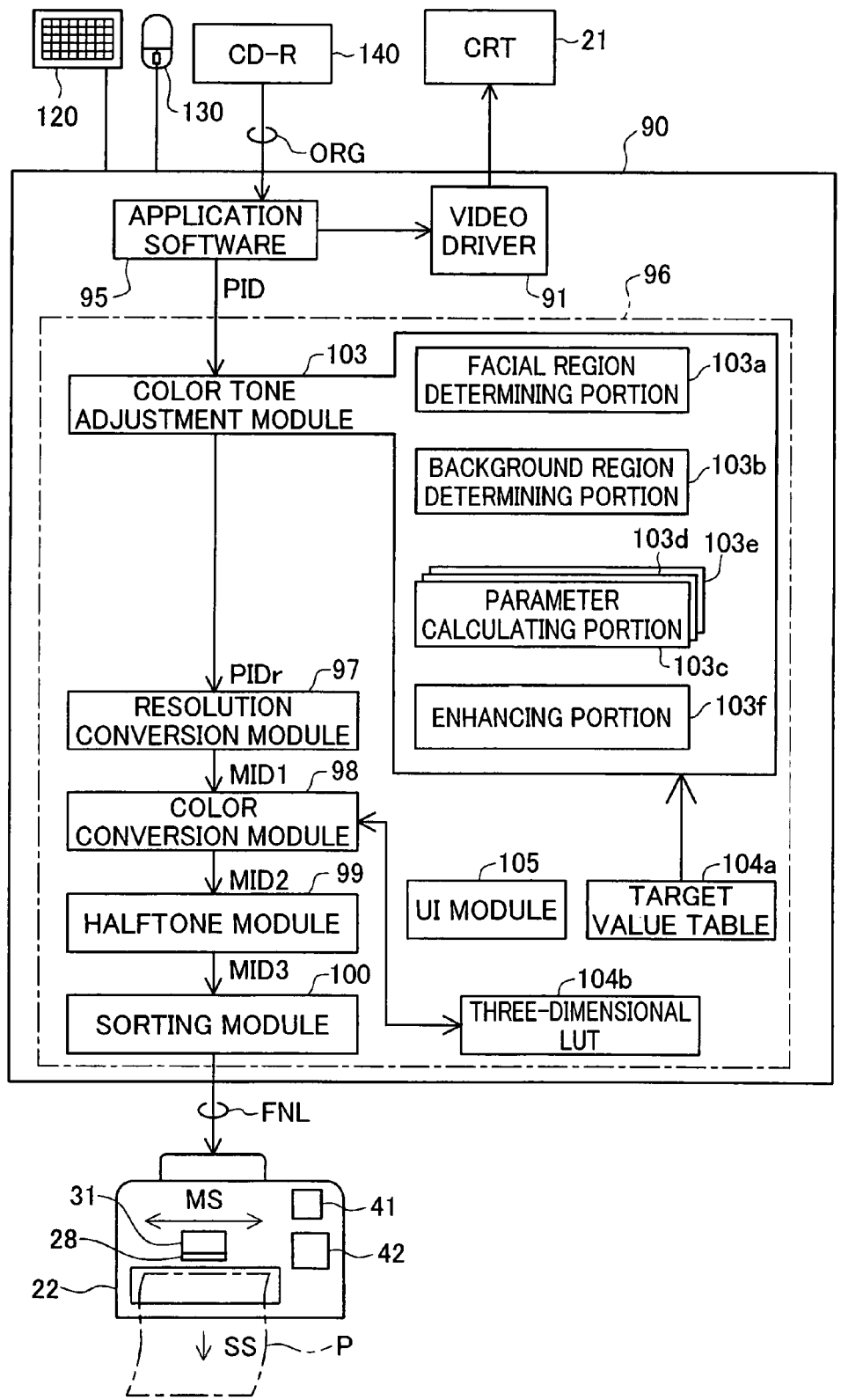
FIG. 1 is a block diagram showing the software arrangement of the printing system of Embodiment 1.

FIG. 1 is a block diagram depicting the software configuration of the printing system of Embodiment 1. On a computer 90, application software 95 runs on a predetermined operating system. The operating system incorporates a video driver 91 and a printer driver 96.

In response to an instruction by the user input from a mouse 130 or a keyboard 120, the application program 95 reads from a CD-R 140 original image data ORG having three color components, i.e. red (R), green (G), and blue (B). Then, in response to an instruction from the user, image retouching or other such process is carried out on the original image data ORG. Through the agency of the video driver 91, the application program 95 displays the processed image on a CRT display 21. When the application program 95 receives a print command from the user, it issues a print command to the printer driver 96 and outputs the processed image to the printer driver 96 as preliminary image data PID. The preliminary image data PID is image data representing the colors of the pixels in the sRGB color system. In the image data, each pixel has tone values (0-225) for the color components red (R), green (G), and blue (B).

The printer driver 96 receives the preliminary image data PID from the application program 95, and converts this data to print image data FNL processable by the printer 22 (here, a multilevel signal for six colors, namely, cyan, magenta, yellow, black, light cyan, and light magenta).

"Light cyan" is an ink color of the same hue as cyan, but with higher lightness than cyan. "Light magenta" is an ink color of the same hue as magenta, but with higher lightness than.

In the example shown in FIG. 1, the printer driver 96 includes a color tone adjustment module 103, a resolution conversion module 97, a color conversion module 98, a halftone module 99, and a sorting module 100.

The color tone adjustment module 103 converts the preliminary image data PID received from the application program 95 into image data PIDr for enhancing the color tone. The image data PIDr is image data containing tone values (0-225) for the color components red (R), green (G), and blue (B) for each pixel, and has the same pixel count as the preliminary image data PID.

In the course of image processing in the printer driver 96, the user can input commands via the mouse 130 or the keyboard 120 at prescribed timing. A function module for prompting the user for prescribed instructions through the display on the CRT 21 and for receiving input via the mouse 130 and keyboard 120 is depicted as UI module (user interface module) 105 in FIG. 1.

The resolution conversion module 97 converts the resolution of the image data PIDr to the resolution at which printing will be carried out by the printer 22, and generates image data MID1.

The color conversion module 98, while looking up in a three-dimensional lookup table 104b, converts the image data MID1 to image data MID2. The image data MID2 is image data that represents color of pixels in terms of density of the ink colors used by the printer 22, i.e. cyan (C), magenta (M), yellow (Y), black (K), light cyan (LC), and light magenta (LM). The three-dimensional lookup table 104b is a lookup table having combinations of tone values for red, green, and blue as input values and having combinations of tone values for cyan, magenta, yellow, black, light cyan, and light magenta as output values.

The halftone module 99 performs halftone processing on the image data MID2 representing the density of each color for pixels in terms of tone values for each color, thereby converting the data to image data MID3 representing the density of each color in terms of the dot on-off state for each pixel (also referred to as "print data" or "dot data").

The image data MID3 generated thereby is sorted by the sorting module 100 in the order in which it is to be sent to the printer 22, and is output as the final print image data FNL.

The printer 22 comprises a mechanism for feeding paper P by means of a feed motor; a mechanism for reciprocating a carriage 31 in the direction MS perpendicular to the paper P feed direction SS, by means of a carriage motor; a print head 28 riding on the carriage 31, for ejecting ink to form dots; P-ROM 42 for storing settings data of various kinds; and a CPU 41 for controlling the paper feed motor, the carriage motor, the print head 28, the P-ROM 42, and a control panel 32. The printer 22 receives the print image data FNL, and in accordance with the print image data FNL executes printing by forming dots on a printing medium using cyan (C), magenta (M), yellow (Y), black (K), light cyan (LC), and light magenta (LM).

Herein, while "printing device" refers in the narrow sense to the printer 22 only, but in the broader sense it represents the printing system as a whole including the computer 90 and the printer 22.

A2. Processing in Color Tone Adjustment Module

Figure 2:
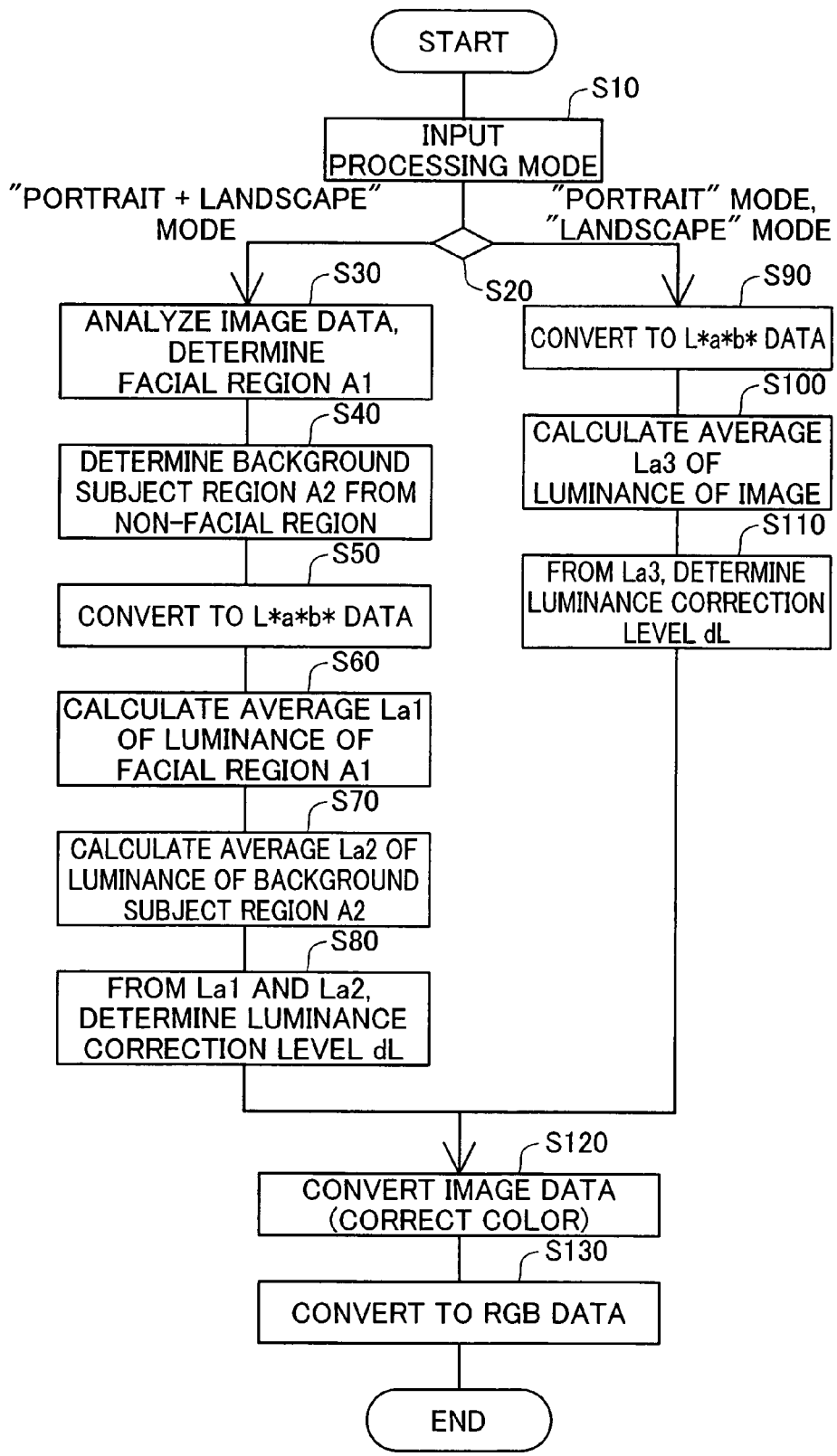
FIG. 2 is a flowchart depicting the process of enhancement in the color tone adjustment module 103.

FIG. 2 is a flowchart depicting the process of enhancement in the color tone adjustment module 103. In Step S10, by operating the mouse 130 and/or the keyboard 120, the user inputs a processing mode command through the user interface screen which is displayed on the CRT 21. The processing mode is selected from among a "portrait" mode for the purpose of processing a photographic image in which a person is the principal object, a "landscape" mode for the purpose of processing a photographic image in which a landscape is the principal object, and a "portrait+landscape" mode in which both a person and a landscape are the principal objects. In Step S10, the user interface module 105 of the printer driver 96 displays the user interface screen on the CRT 21, as well as receiving input from the user via the mouse 130 and/or the keyboard 120.

Figure 3:
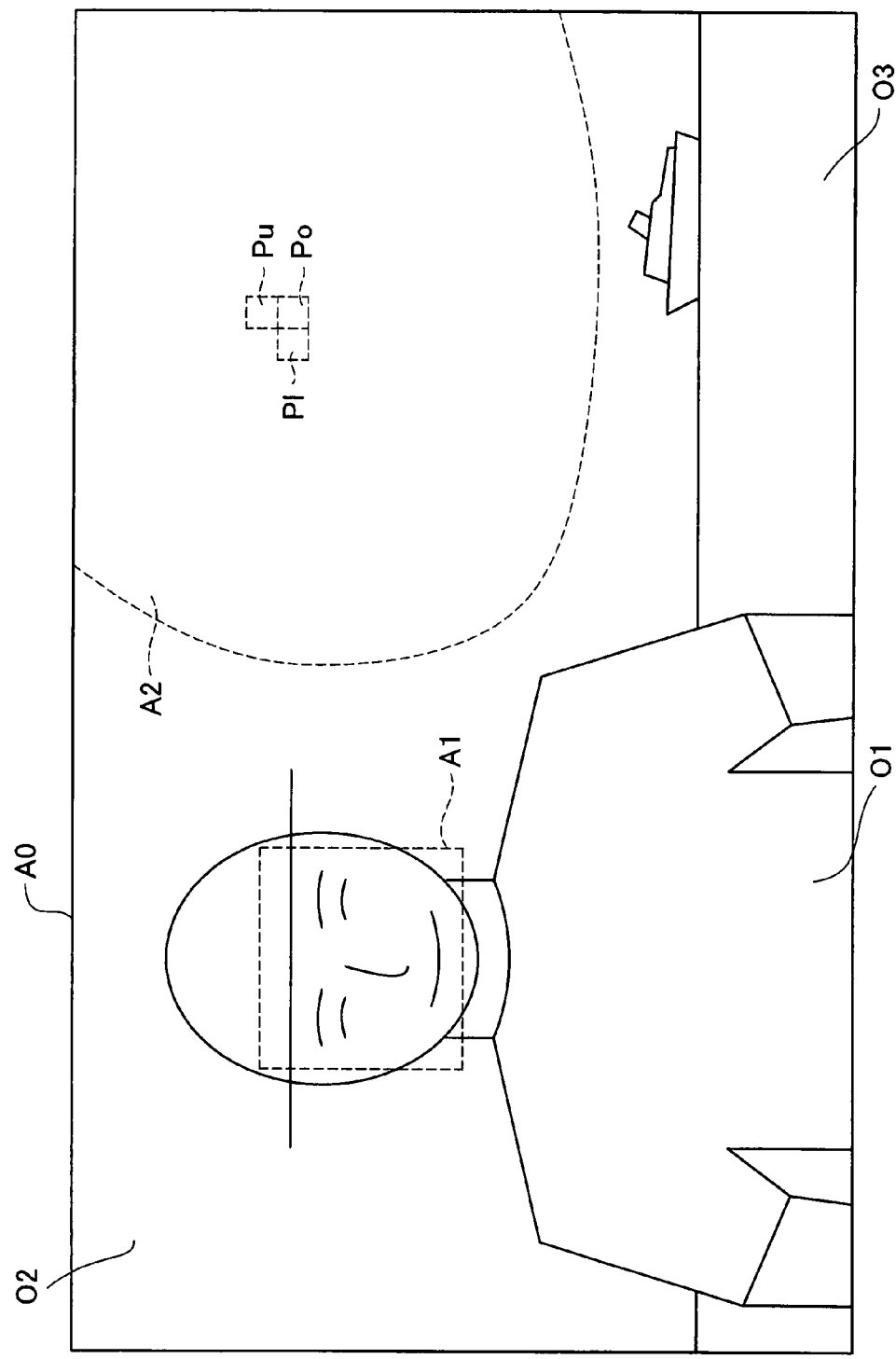
FIG. 3 shows a facial region A1 and a background subject region A2 within an image A0 of preliminary image data PID.

FIG. 3 is shows a facial region A1 and a background subject region A2 within an image A0 of preliminary image data PID. In the embodiment, the preliminary image data PID sent from the application program 95 is photographic image data that has been generated by a digital still camera. The image of the preliminary image data PID includes as objects a person O1, sky O2, and sea O3. The photographic image of the preliminary image data PID is a photographic image in which the person O1 and the background sky O2 and sea O3 are equally principal objects. In the case of processing an image of this kind, the user will select the "portrait+landscape" mode in Step S10.

In Step S20, the color tone adjustment module 103 determines whether the processing mode input in Step S10 was the "portrait+landscape" mode, or the "portrait" mode or "landscape" mode. In the event that the processing mode input in Step S10 was the "portrait+landscape" mode, the process advances to Step S30. In the event that the processing mode input in Step S10 was the "portrait" mode or "landscape" mode, the process advances to Step S90. Processes starting with Step S20 in the flowchart of FIG. 2 are executed by the color tone adjustment module 103.

In Step S30, the color tone adjustment module 103 analyzes the preliminary image data PID and determines the facial region A1. This determination of the facial region A1 may be accomplished, for example, by sequentially matching basic patterns of the human eyes and mouth with standard patterns, for portion of the image of the preliminary image data PID. In the embodiment, a region of rectangular shape that includes the eyes and the mouth is identified as the facial region A1 (see FIG. 3). The functional part of the color tone adjustment module 103 for analyzing the preliminary image data PID and determining the facial region A1 is shown as facial region determining portion 103a in FIG. 1.

In Step S40 of FIG. 2, the color tone adjustment module 103 determines a background subject region A2 from a region of the image A0 except for the facial region A1. The background subject region A2 may be determined in the following manner, for example. Specifically, pixels contained in a region of the image A0 outside the facial region A1 are first sequentially compared with neighboring pixels. The neighboring pixels for comparison for a pixel Po of interest are the neighboring pixel Pu situated above, and the neighboring pixel Pl situated at left (see FIG. 3).

In the event that neighboring pixels are similar in color, the pixel Po of interest is classed into the same group as the comparison pixels. More specifically, in the event that neighboring pixels (e.g. pixel P1 and pixel Po) have differences among their red, green, and blue tone values that are respectively smaller than certain prescribed values, pixel Po will be classed into the same group as the comparison pixel. In this way, pixels in areas of the image A0 except for the facial region A1 are classified into one or more groups.

From among groups created in this way, the region occupied by the group with the most pixels is selected as the background subject region A2. The functional part of the color tone adjustment module 103 for analyzing the preliminary image data PID and determining the background subject region A2 is shown as background region determining portion 103b in FIG. 1.

In Step S50, the preliminary image data PID in which colors of pixels are represented by tone values in the RGB color system is converted to image data PIDL which colors of pixels are represented by tone values in the L*a*b color system.

In Step S60, an average luminance value La1 is calculated for the pixels contained in the facial region A1. Specifically, the average value of luminance L* is calculated for pixels of image data PIDL corresponding to pixels included in the facial region A1 of the preliminary image data PID. The functional part of the color tone adjustment module 103 for calculating the average luminance value La1 for the pixels contained in the facial region A1 is shown as first parameter calculating portion 103c in FIG. 1.

In Step S70, an average luminance value La2 is calculated for the pixels contained in the background subject region A2. In the same manner as in Step S60, the average value of luminance L* is calculated for pixels of image data PIDL corresponding to pixels included in the background subject region A2 of the preliminary image data PID. The functional part of the color tone adjustment module 103 for calculating the average luminance value La2 for the pixels contained in the background subject region A2 is shown as second parameter calculating portion 103d in FIG. 1.

In Step S80, a luminance correction level dL is calculated from the average luminance value La1 for pixels contained in the facial region A1 and the average luminance value La2 the pixels contained in the background subject region A2. The luminance correction level dL is calculated using the following Eq. (1):

$$dL = \alpha \times (Lt1 - La1) + (1-\alpha) \times (Lt2 - La2) \quad (1)$$

Here, Lt1 is the target luminance of the facial region A1. Lt1 can be set to 70, for example. Lt2 is the target luminance of the background subject region A2. Lt2 can be set to 50, for example. These target luminance values are held in a target value table 104a by the printer driver 96 (see FIG. 1). In Eq. (1), a is a weight appended to the difference between the average luminance La1 and the target luminance of the facial region A1, and is a factor meeting the condition: ($0 < \alpha \leq 1$). Consequently, (1-$\alpha$) is a weight appended to the difference between the average luminance La2 and the target luminance of the background subject region A2.

By prescribing luminance correction level dL in this way, the luminance correction level dL for an image can be determined while taking into consideration both deviance of the luminance of the facial region A1 from the ideal luminance Lt1 of the facial region A1 (Lt1-La1), and deviance of the luminance of the background subject region A2 from the ideal luminance Lt2 of the background subject region A2 (Lt2-La2).

Figure 4:
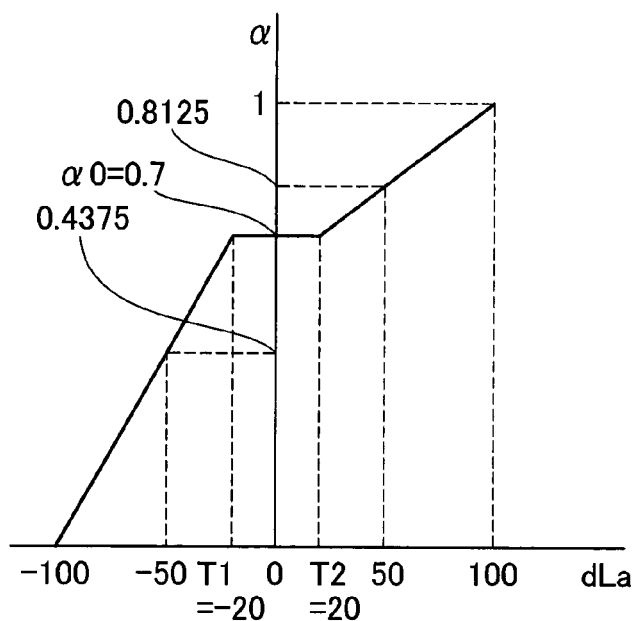
FIG. 4 is a graph for specifying the weight a based on the difference dLa between the average luminance value La1 of pixels contained in the facial region A1, and the average luminance value of the background subject region A2.

FIG. 4 is a graph for specifying the weight a based on the difference dLa between the average luminance value La1 of pixels contained in the facial region A1, and the average luminance value of the background subject region A2. In the region in which the difference dLa of La1 and La2 is ±20, $\alpha$ is a constant value $\alpha 0=0.7$. In the region in which dLa is greater than 20, $\alpha$ increases in linear fashion in association with increasing dLa. In the region in which dLa is less than −20, $\alpha$ decreases in linear fashion in association with decreasing dLa. When dLa is 100, $\alpha$ is 1, and when dLa is −100, $\alpha$ is 0.

By specifying a in the manner illustrated in FIG. 4, when the facial region A1 and the background subject region A2 have similar luminance (when −20<dLa<20), the weight appended to deviance of luminance of the facial region A1 will be 0.7. In instances where a person and a landscape are both principal objects, a person viewing the photographic image will be more sensitive to the brightness of the person's face than to that of the background. Consequently, in cases where the facial region A1 and the background subject region A2 have similar luminance, by determining a correction level through weighting that places more emphasis on correcting deviance of the facial region A ($\alpha > 0.5$), it is possible to correct luminance in such as way as to produce an image that appears natural to the viewer.

Moreover, by specifying a in the manner illustrated in FIG. 4, in instances where the facial region A1 has significantly higher luminance than the background subject region A2 (dLa>20), weighting is carried out placing more emphasis on correcting deviance of the facial region A1 as compared to when the two are similar (i.e. when −20<dLa<20). By determining the weighting level in this way, it is possible to prevent circumstances in which correction results in unnatural whiteness of the person's face.

Furthermore by specifying a in the manner illustrated in FIG. 4, in instances where the facial region A1 has significantly lower luminance than the background subject region A2 (dLa<−20), weighting is carried out placing more emphasis on correcting deviance of the background subject region A2 as compared to when the two are similar (i.e. when −20<dLa<20). By determining the weighting level in this way, it is possible to prevent circumstances in which correction results in unnatural whiteness of the background.

Where the difference in luminance of the facial region A1 and of the background subject region A2 are about the same, weighting is carried out placing more emphasis on the facial region. For example, in the event that dLa=50 and the facial region A1 is brighter, the weight a of the facial region A1 is 0.8125. On the other hand, in the event that dLa=−50 and the background subject region A2 is brighter, $\alpha$ is 0.4375 and the weight (1-$\alpha$) of the background subject region A2 is 0.5625. As noted earlier, people are more sensitive to the brightness of a face than to the brightness of the background. Consequently, by performing weighting in this manner, it is possible to correct brightness so as to afford an image of natural appearance.

Figure 5:
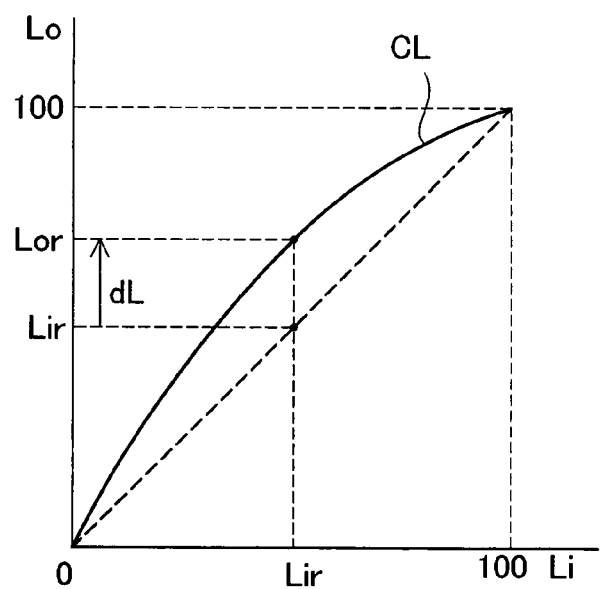
FIG. 5 is a tone curve illustrating a method of modifying luminance L* of pixels of image data PIDL.

FIG. 5 shows a tone curve CL that illustrates a method of modifying luminance L* of pixels of image data PIDL. Luminance input values Li are plotted on the horizontal axis and luminance output values Lo on the vertical axis. The tone curve of FIG. 5 is a tone curve which, at a luminance input value of Lir, increases luminance by dL. The value of Lir could be, for example, 50, which represents the median value of the luminance tone values 1-100. The tone curve of FIG. 5 is a quadratic tone curve that replaces a luminance input value of 0 with a luminance output value of 0, and a luminance input value of 100 with a luminance output value of 100. In FIG. 5, the output value corresponding to the input value Lir is denoted as Lor. In actual practice, the tone curve described herein is provided as a table that includes input values and output values that are discrete values.

In Step S120, the color tone adjustment module 103 generates the tone curve of FIG. 5, in accordance with the dL calculated in Step S80. The luminance of the pixels of the image data PIDL represented by tone values in the L*a*b* color system are then modified in accordance with the tone curve of FIG. 5. Hereinafter this modified image data shall be denoted as image data PIDLr.

In Step S130, the image data PIDLr created in this way is converted to image data PIDr represented by tone values (0-255) in the RGB color system (see FIG. 1). The functional part of the color tone adjustment module 103 that performs the functions of generating the tone curve, image conversion to modify color tone, and creation of the PIDr data in the above manner is shown as an enhancing portion 103f in FIG. 1.

On the other hand, if in Step S20 of FIG. 2 the processing mode input in Step S10 is the "portrait" mode or "landscape" mode, the process advances to Step S90.

In Step S90, in the same manner as in Step S50, the preliminary image data PID representing pixel colors as tone values in the RGB color system is converted to image data PIDL representing pixel colors as tone values in the L*a*b* color system.

In Step S100, an average luminance value La3 for luminance L* of all pixels of the image data PIDL is calculated. The function of calculating the average luminance value La3 for luminance L* of all pixels of the image data PIDL is performed by a third parameter calculation portion 103e constituting a functional part of the color tone adjustment module 103 (see FIG. 1).

Subsequently, the luminance modification level dL is calculated in accordance with the following Eq. (2).

$$dL = Lt3 - La3 \quad (2)$$

Here, Lt3 is target luminance. Where "portrait" mode has been selected in Step S10, Lt3 will be replaced with the target luminance Lt1 of the facial region A1. On the other hand, where "landscape" mode has been selected in Step S10, Lt3 will be replaced with Lt2. These target luminance values Lt1, Lt2 are held in the target value table 104a by the printer driver 96 (see FIG. 1).

Subsequently, the processes in Steps S120 and S130 are carried out in the manner described previously. The functions of Steps S110-S130 are performed by an enhancing portion 103f constituting a functional part of the color tone adjustment module 103.

As discussed previously, in Embodiment 1, in the "portrait+landscape" mode process, average values for luminance La1, La2 are calculated respectively for the facial region A1 in the image data and the background subject region A2 different from the facial region A1; and on the basis of these average values, the luminance of the preliminary image data PID is adjusted to created image data PIDr. Thus, there is little likelihood of unnatural brightness of the background such as can occur where a luminance adjustment level is determined on the basis of facial region data exclusively. Moreover, there is little likelihood of unnatural brightness of a person's face such as can occur where a luminance adjustment level is determined on the basis of background data exclusively. That is, color tone can be adjusted in such a way that both people and background will have brightness levels that appear natural to the user.

In Embodiment 1, during processing in "portrait" mode and in "landscape" mode, the average value of luminance La3 for the image as a whole is calculated, and on the basis of this average value the luminance of the preliminary image data PID is adjusted to created image data PIDr. Thus, the brightness of the preliminary image data PID image as a whole can be adjusted to brightness appropriate to a portrait photograph and a landscape photograph.

B. Embodiment 2

In Embodiment 2, a photographic image "scene" is determined on the basis of regions except for the facial region A1, and the luminance target values Lt1, Lt2 are determined on the basis of the determined "scene." Other processes and device configurations of Embodiment 2 are the same as those of Embodiment 1.

Figure 6:
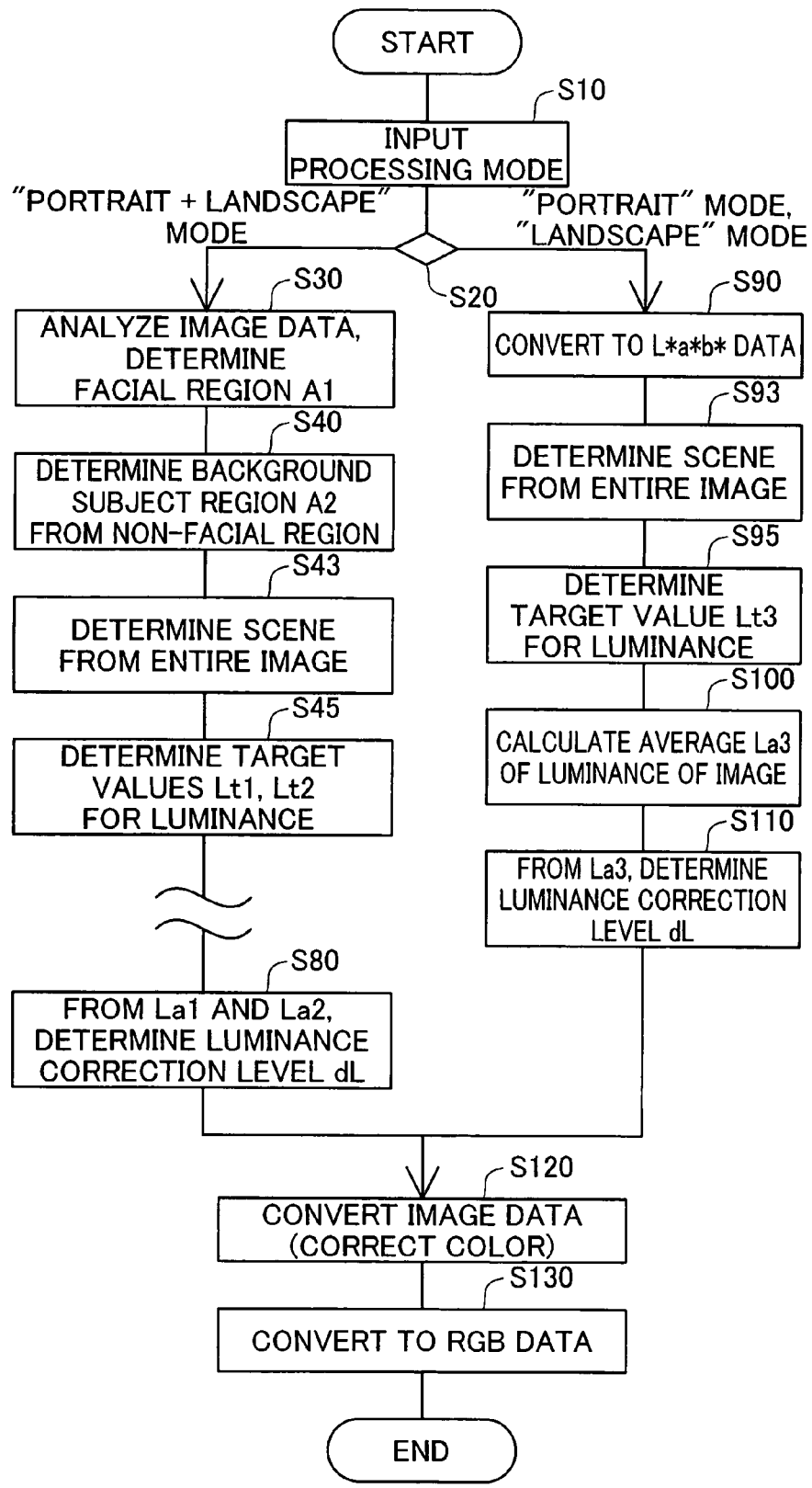
FIG. 6 is a flowchart depicting the process of enhancement in Embodiment 2.

FIG. 6 is a flowchart depicting the process of enhancement in Embodiment 2. The processes of the flowchart of FIG. 6 are the same as those of the flowchart of FIG. 2, except for Steps S43, S45, S93, and S95. Steps S50-S70, which have the same process content as in the flowchart of FIG. 2, have been omitted from the illustration in the flowchart of FIG. 6.

In Embodiment 2, after Step S40, the color tone adjustment module 103 in Step S43 determines a "scene" of the preliminary image data PID image, on the basis of the preliminary image data PID. The "scene" is selected, for example, from among a plurality of alternatives such as "clear sky," "sunset sky," "trees," and so on. "Scenes" can be determined based on average color of all pixels of the preliminary image data PID. Specifically, "scenes" can be determined on the basis of the average value of red tone values, the average value of green tone values, and the average value of blue tone values for all pixels in the preliminary image data PID. In the event that the preliminary image data PID stores Exif (Exchangeable Image File Format) data, "scenes" can be determined on the basis of the Exif data.

In Step S45, on the basis of the scene determined in Step S43, the luminance target value Lt1 of the facial region A1 and the luminance target value Lt2 of the background subject region A2 are determined. For example, where the "scene" is "sunset sky," Lt2 will be set to 30. Where the "scene" is "clear sky," Lt2 will be set to 50. Similarly, the luminance target value Lt1 of the facial region A1 will be determined depending on the scene. Luminance target values Lt1, Lt2 for these "scenes" are already stored in the target value table 104a by the printer driver 96 (see FIG. 1).

After Step S45, processing is carried out analogously to the processing beginning with Step S50 of Embodiment 1 (see FIG. 2).

In the meantime, after Step S90, Step S93 is executed. The process content of Step S93 is the same as in Step S43. Specifically, a "scene" is determined on the basis of the preliminary image data PID. Then, in Step S95, a luminance target value Lt3 is determined depending on the "scene" determined in Step S93 and the processing mode input in Step S10. Luminance target values Lt3 for these "scenes" and processing modes are already stored in the target value table 104a by the printer driver 96.

After Step S95, processing starting with Step S100 is carried out analogously to the flowchart of FIG. 2.

According to Embodiment 2, target luminance depending on a particular scene can be established for each set of image data. Thus, it is possible to prevent a situation where an image appears unnaturally bright as a result of correction, even where the scene is a sunset scene. That is, enhancement can be carried out in a manner appropriate to the content of the image data.

C. Embodiment 3

In Embodiment 1, the weighting factor $\alpha$ for determining the luminance correction level dL was determined based on the difference dLa between the average value of luminance La1 of pixels in the facial region A1 and the average value of luminance La2 of pixels in the background subject region A2 (see FIG. 4). In Embodiment 3, the weighting factor is determined based on the proportion Rf of the entire image A0 occupied by the facial region A1. The processes of Steps S90-S110 of FIG. 2 are not executed in Embodiment 3, but in other respects Embodiment 3 is the same as Embodiment 1.

Figure 7:
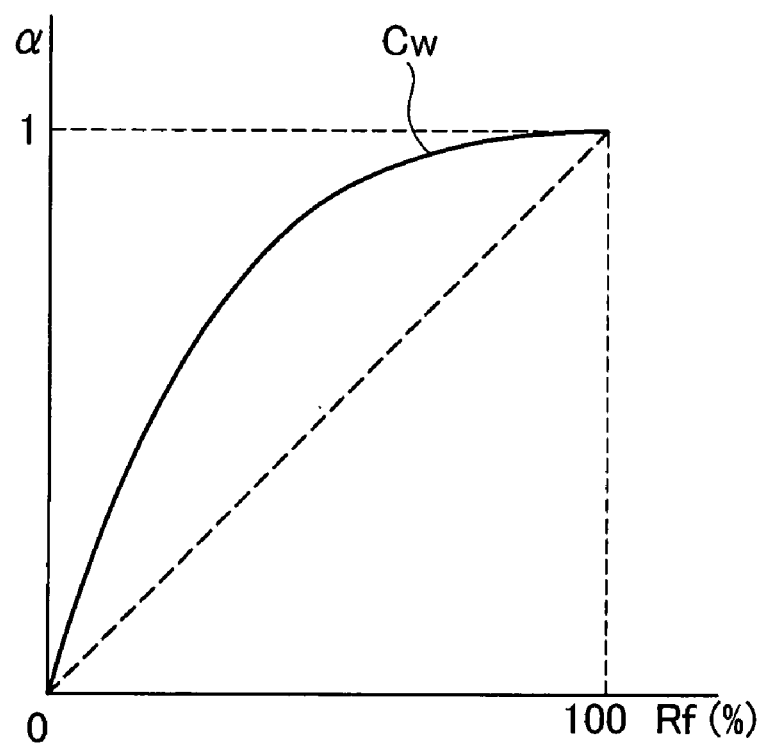
FIG. 7 is a graph specifying the relationship of proportion Rf of the facial region A1 to the weighting factor α of the facial region A1.

FIG. 7 is a graph Cw specifying the relationship of proportion Rf of the facial region A1 to the weighting factor $\alpha$ of the facial region A1. When the proportion Rf of the facial region A1 is 0, the weighting factor $\alpha$ is 0 as well, and when the proportion Rf of the facial region A1 is 100%, the weighting factor $\alpha$ is 1. $\alpha$ increases along a convex curve in association with increasing Rf. The proportion Rf of the facial region A1 is derived by dividing the pixel count of the facial region A1 by the total pixel count of the image.

In Embodiment 3, the larger the proportion of the image A0 occupied by the facial region A1 is, the greater the extent to which weighting will emphasize correcting deviance of the facial region A in the determination of the correction level dL (see Eq. (1)). The larger the proportion of the image A0 occupied by the background subject region A2 is, the greater the extent to which weighting will emphasize correcting deviance of the background subject region A2 in the determination of the correction level dL. In other words, luminance correction will be carried out weighting with greater emphasis on the region that occupies a large proportion of the image and that will be quite noticeable to the user. It is therefore possible to produce images that will be assessed highly by the user.

The weighting factor $\alpha$ increases along a convex curve in association with increasing Rf. For an area of the same given size in an image, the human eye will place greater emphasis on the color tone of a human face than on the color tone of the background. Consequently, by performing luminance correction while determining the weighting factor along a curve like that of FIG. 7, it is possible to produce images that will be assessed highly by the user.

D. Embodiment 4

In Embodiments 1-3, luminance correction was performed for the preliminary image data PID, and then image data PIDr was created (see FIG. 1 and FIG. 5). In Embodiment 4, image data PIDr is created through modification of red, green, and blue tone values of the pixels of the preliminary image data PID on the basis of a tone curve. In other respects, Embodiment 4 is the same as Embodiment 2.

Figure 8:
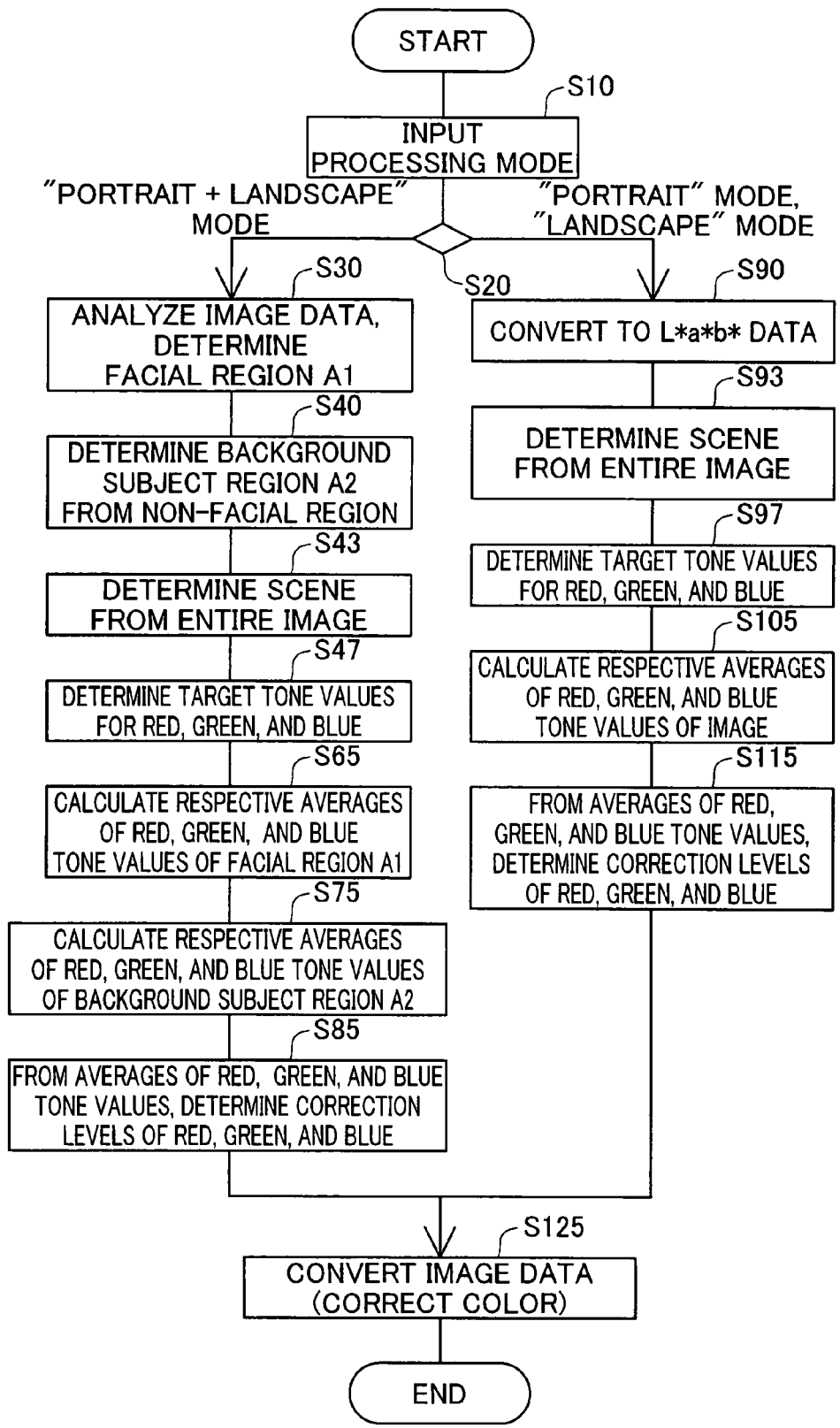
FIG. 8 is a flowchart of the enhancement process in Embodiment 4.

FIG. 8 is a flowchart of the enhancement process in Embodiment 4. The processes of Steps S10-S43, S90, and S93 of the flowchart of FIG. 8 are the same as in the flowchart of FIG. 6.

In Step S47, on the basis of the scene determined in Step S43, red, green, and blue target tone values Vrt1, Vgt1, Vbt1 of the facial region A1 and red, green, and blue target tone values Vrt2, Vgt2, Vbt2 of the background subject region A2 are determined. These "scene"-dependent RGB target tone values are already stored in the target value table 104a by the printer driver 96 (see FIG. 1).

In Embodiment 4, conversion from the preliminary image data PID to L*a*b* color space image data PIDL does not take place (see Step S50 of FIG. 2). As a result, reverse conversion from image data PIDL to RGB color system image data PIDr does not take place either (see Step S130 of FIG. 2).

In Step S65, average values Vra1, Vga1, Vba1 of the red, green, and blue tone values of the facial region A1 are calculated. In Step S75, average values Vra2, Vga2, Vba2 of the red, green, and blue tone values of the background subject region A2 are calculated.

In Step S85, correction levels dR, dG, dB of the red, green, and blue tone values are calculated with the following equations. α4 is a weighting factor relating to correction of RGB tone values of the facial region A1.

$$dR=\alpha 4\times(Vrt1-Vra1)+(1-\alpha 4)\times(Vrt2-Vra2) \quad (3)$$

$$dG=\alpha 4\times(Vgt1-Vga1)+(1-\alpha 4)\times(Vgt2-Vga2) \quad (4)$$

$$dB=\alpha 4\times(Vbt1-Vba1)+(1-\alpha 4)\times(Vbt2-Vba2) \quad (5)$$

Figure 9:
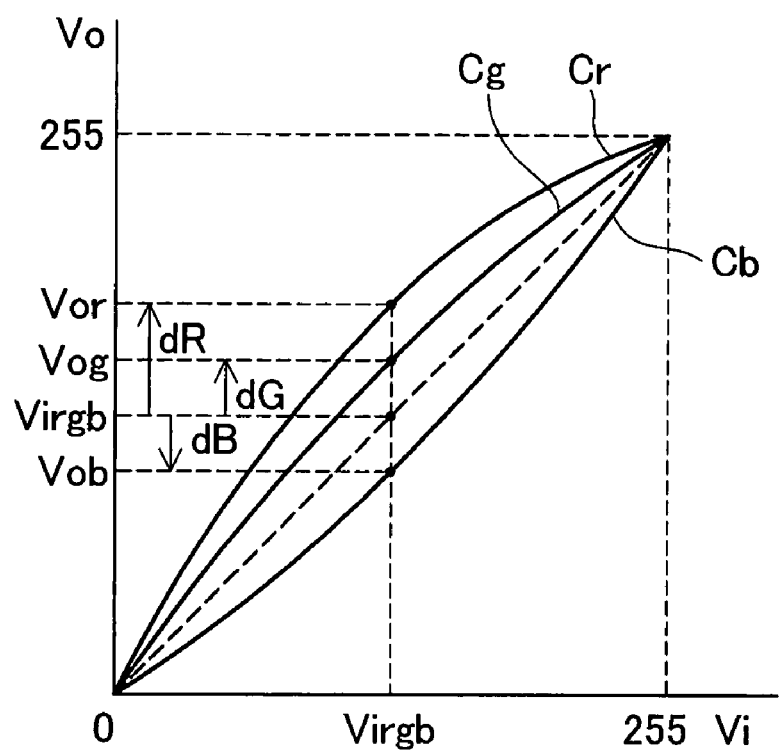
FIG. 9 is a diagram depicting tone curves for the purpose of modifying red, green, and blue tone values of the pixels of the preliminary image data PID.

FIG. 9 shows tone curves for the purpose of modifying red, green, and blue tone values of the pixels of the preliminary image data PID. The horizontal axis in FIG. 9 indicates red, green, and blue input tone values Vi (0-255), while the vertical axis indicates red, green, and blue output tone values Vo (0-255). The red tone curve Cr is a tone curve that increases the input tone value Virgb by dR. The green tone curve Cg is a tone curve that increases the input tone value Virgb by dG. The blue tone curve Cb is a tone curve that increases the input tone value Virgb by dB. In the example of FIG. 9, dR and dG are positive values, and dB is a negative value. The input tone value Virgb can be 128, which is the medial value between 0 and 255.

The tone curves Cr, Cg, Cb are each a quadratic tone curve that substitutes an output tone value of 0 for an input tone value of 0, and an output tone value of 255 for an input tone value of 255. In FIG. 9, Vor denotes the red output tone value corresponding to the input tone value Virgb. Vog denotes the green output tone value corresponding to the input tone value Virgb. Vob denotes the blue output tone value corresponding to the input tone value Virgb.

In Step S125 of FIG. 8, tone curves Cr, Cg, Cb like those depicted in FIG. 9 are generated based on the correction level dR, dG, dB, and image conversion is carried out on the basis of the tone curves Cr, Cg, Cb. As a result, image data PIDr is created from the preliminary image data PID (see FIG. 1).

In the meantime, in Step S97, red, green, and blue target tone values Vrt3, Vgt3, Vbt3 are determined depending on the "scene" determined in Step S93 and on the processing mode input in Step S10. These RGB target tone values dependent on the "scene" and the processing mode are already stored in the target value table 104a by the printer driver 96.

In Step S105, average values Vra2, VGa3, Vba3 of the red, green, and blue tone values of all pixels of the preliminary image data PID are calculated. In Step S115, red, green, and blue modification levels dR, dG, dB are calculated according to the following Equations (6) to (8).

$$dR=Vrt3-Vra3 \quad (6)$$

$$dG=Vgt3-Vgra3 \quad (7)$$

$$dB=Vbt3-Vba3 \quad (8)$$

Subsequently, in Step S125, the tone curves Cr, Cg, Cb (see FIG. 9) are generated, and image conversion is carried out on the basis of these tone curves Cr, Cg, Cb.

According to Embodiment 4, it is possible to adjust not only luminance, but also saturation and hue for an image of image data, so that both people and background in the image will have brightness that appears natural to the user.

E. Modified Examples

The invention is not limited to the embodiments and aspects described herein above, and may be reduced to practice in various forms without departing from the spirit thereof. Modified examples such as the following are possible, for example.

E1. Modified Example 1

In the preceding embodiments, there was a single facial region A1 (see FIG. 3). However, a plurality of facial regions could be identified within an image. Specifically, one or more facial regions could be identified on the basis of pattern matching or pixel color. Additionally, when calculating average values of luminance and of tone values of color components, it is possible for average values to be calculated based on all pixels in this plurality of facial regions. Alternatively, it is possible for average values to be calculated based on a prescribed number of facial regions taken, in order from the largest, from among a plurality of facial regions. Additionally, where rankings have been assigned to a plurality of facial regions in order from the largest, it is possible for average values to be calculated based on facial regions with rankings above a certain prescribed proportion.

E2. Modified Example 2

In the preceding embodiments, the background subject region A2 constitutes a region which is part of the region except for the facial region A1 (see FIG. 3). However, the background subject region A2 could instead constitute the entire region of the image A0 except for the facial region A1. Alternatively, the background subject region A2 could be established so as to include the region except for the facial region A1, as well as part of the facial region A1. The background subject region A2 could also be established so as to include the region except for the facial region A1, as well as the entire facial region A1.

In the preceding embodiments, in the event that the color of a given pixel is similar to the color of an adjacent pixel situated above or to the left side, the pixels are classified into the same group (see FIG. 3). However, comparisons among pixels could instead be carried out between a given pixel and an adjacent pixel situated to the right side, or between a given pixel and an adjacent pixel situated below it.

Groups of pixels of the region except for the facial region A1 could also be determined by some method other than comparing color among adjacent pixels. For example, pixels of color similar, by more than a certain extent, to a prescribed standard color such as clear sky standard color, sunset sky standard color, or tree green, could be classified into the same group.

Furthermore, in the preceding embodiments, a single group with the highest pixel count among such groups was designated as the background subject region A2. However, the background subject region A2 could be determined by some other method. For example, the background subject region A2 could be the background subject region A2 for a prescribed number of groups from among the largest of the plurality of groups. Additionally, where rankings have been assigned to a plurality of groups in order from the largest, only groups of ranking above a certain prescribed proportion could be designated as the background subject region A2.

In enhancing the image, the first region may be decided in any ways other than that of the preceding embodiments. The second region may also be decided in any ways other than that of the preceding embodiments. The second region may be a region different from the first region. The first and second regions may share a part of the region. The image enhancement may be performed based on one or more parameters calculated based on the first and second region.

E3. Modified Example 3

In Embodiment 1, when the difference between luminance of the facial region A1 and the background subject region A2 is within a given range that includes 0, the weighting factor $\alpha 0$ of the facial region A1 was 0.7 (see FIG. 4). However, some other value may be used as the weight $\alpha 0$ of the facial region A1 when the difference between luminance of the facial region A1 and the background subject region A2 is within a given range. However, in preferred practice $\alpha 0$ will be a value greater than 0.5. By specifying the weighting factor $\alpha 0$ of the facial region A1 in this way, when the facial region A1 and the background subject region A2 are similar in luminance, correction can be carried out with emphasis on correcting color of the facial region as opposed to the background. In preferred practice, when the difference between luminance of the facial region A1 and the background subject region A2 is within a given range, the weighting factor $\alpha 0$ of the facial region A1 will preferably be 0.6-0.8, more preferably 0.65-0.75.

The graph specifying the weighting factor $\alpha 0$ of the facial region A1 can be constituted as a curve. In preferred practice, however, the slope of a within a given range that includes a difference dLa of 0 between luminance of the facial region A1 and the background subject region A2 will be smaller than the slope of a where dLa is outside of that the range Additionally, the weighting factor $\alpha 0$ of the facial region A1 within a given range that includes a difference dLa of 0 between luminance of the facial region A1 and the background subject region A2 can also be determined on the basis of the proportion Rf of the image occupied by the facial region A1. The weighting factor $\alpha 0$ of the facial region A1 can also be specified on the basis of both the difference in luminance of the facial region A1 and or the background subject region A2, and the proportion Rf of the image occupied by the facial region A1 (see FIG. 4 and FIG. 7).

E4. Modified Example 4

In Embodiment 1, the tone curve for carrying out correction of luminance was a tone curve passing through the three points (0, 0), (Lir, Lor), and (100, 100) (see FIG. 5). The input tone value Lir used as the standard when generating the tone curve was L*=50. However, some other value could be used as the input tone value Lir for the standard when generating the tone curve. For example, a value equivalent to ideal luminance of a person's face (e.g. L*=70) could be used. The input tone value Lir used as the standard when generating the tone curve can also be specified on the basis of "scene" (see Step S10 of FIG. 2) or processing mode (see Steps S43, S93 of FIG. 6).

Also, in Embodiment 1, the tone curve for luminance was a quadratic curve passing through three points (see FIG. 5). However, the tone curve could instead be a cubic curve, a quartic curve, a spline curve, a Bezier curve, or some other curve.

Similarly, for the red, green, and blue tone curves Cr, Cg, Cb of Embodiment 4 as well, input tone value Virgb used as the standard can assume various values, as with the luminance tone curve. Also, the input tone value used as the standard can have mutually independent values for red, green, and blue. The red, green, and blue tone curves Cr, Cg, Cb could also be cubic curves, quartic curves, spline curves, Bezier curves, or some other curve, instead of quadratic curves.

E5. Modified Example 5

In Embodiment 2, the "scene" was specified on the basis of the image as a whole (see Steps S43, S93 of FIG. 6). However, scenes could be specified by some other method. For example, "scene" could be specified on the basis of a region except for the facial region A1, from the entire image A0.

E6. Modified Example 6

In the preceding embodiments, the printing system was constituted as a system including the computer 90, the CRT display 21, the mouse 130 and/or keyboard 120, and the printer 22. However, the printing system which is one aspect of the present invention could also be constituted as an integrated printer having a card hold able to read a memory with image data stored thereon, a display able to display a user interface screen, buttons allowing the user to input commands, and the modules of the printer driver 96 in Embodiment 1.

E7. Modified Example 7

In the preceding embodiments, some of the arrangements achieved through hardware could be replaced by software, and conversely some of the arrangements achieved through software could be replaced by hardware. For example, some of the functions of the printer driver 96 (see FIG. 1) could be executed by an application program 95, application programs or the CPU 41 of the printer 22.

A computer program for realizing such functions could be provided in a form recorded on a flexible disk, CR-ROM, or other such computer-readable recording medium. The host computer could read the computer program from the recording medium and transfer it to an internal storage device or an external storage device. Alternatively, the computer program may be provided to the host computer from a program providing device via a communications pathway. When realizing the functions of a computer program, the computer program stored in an internal storage device is executed by the microprocessor of the host computer. Alternatively, the computer program recorded on the recording medium can be executed directly by the host computer.

"Computer" herein refers to a concept that includes hardware devices and an operating system, and means that the hardware devices operate under the control of the operating system. The computer program accomplishes the functions of the parts described above on such a host computer. Some of the aforementioned functions can be realized by the operating system, rather than by an application program.

In this invention, "computer-readable recording medium" is not limited to flexible disks, CR-ROM, or other portable recording media, but can include computer internal storage devices such various kinds of RAM and ROM, as well as hard disks and other external storage devices fixed to the computer.

The Program product may be realized as many aspects. For example:
(i) Computer readable medium, for example the flexible disks, the optical disk, or the semiconductor memories;
(ii) Data signals, which comprise a computer program and are embodied inside a carrier wave;
(iii) Computer including the computer readable medium, for example the magnetic disks or the semiconductor memories; and
(iv) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A method for enhancing image data, comprising:
analyzing image data, and determining a first region which is part of an image of the image data; and
enhancing the image data based on values of first and second parameters, the value of the first parameter being determined based on pixel values of the image data which corresponds to the first region, the value of the second parameter being determined based on pixel values of the image data corresponding to a second region which is part of the image and which differs from the first region, wherein
the enhancing the image data includes
preparing a first target value representing an ideal value for the first parameter, and a second target value representing an ideal value for the second parameter,
calculating a weight for the weighted average based on a difference between the value of the first parameter and the value of the second parameter, and
enhancing the image data based on the weighted average of a difference between the first target value and the value of the first parameter, and a difference between the second target value and the value of the second parameter, the difference between the first target value and the value of the first parameter and the difference between the second target value and the value of the second parameter being obtained by a subtraction operation.

2. The method of claim 1, wherein
the first region is a region in which a human face is present.

3. The method of claim 2, wherein
calculating the second parameter includes
determining, as the second region, a region taken from a region except for the first region of the image and whose colors of neighboring pixels resemble each other by at least a prescribed degree.

4. The method of claim 2, further comprising:
receiving a selection made by a user of one mode from among a plurality of processing modes including: a first processing mode for processing an image whose main target is a human object; a second processing mode for processing an image whose main target is a landscape; and a third processing mode for processing an image whose main target includes both a human object and a landscape; and
calculating a value of a third parameter based on the image data, in a case where the first or second processing mode has been selected from among the plurality of processing modes, the value of the third parameter being determined based on pixel values of the image data corresponding to a third region in the image, the third region being different from the first and second regions, wherein
the enhancing the image data further includes:
enhancing the image data based on the third parameter, in a case where the first or second processing mode has been selected from among the plurality of processing modes; and
enhancing the image data based on the first and second parameters, in a case where the third processing mode has been selected from among the plurality of processing modes.

5. The method of claim 1, wherein
the enhancing the image data further includes:
calculating a weight for the weighted average based on a proportion of the first region to the entire image.

6. The method of claim 1, wherein
the first parameter is average brightness of the first region, and
the second parameter is average brightness of the second region.

7. The method of claim 1, wherein
the first parameter is an average brightness of the first region, and
the second parameter is an average brightness of the second region, and wherein
the first target value and the second target value are determined according to a scene of a picture image determined based on the image data.

* * * * *